Figure 3:
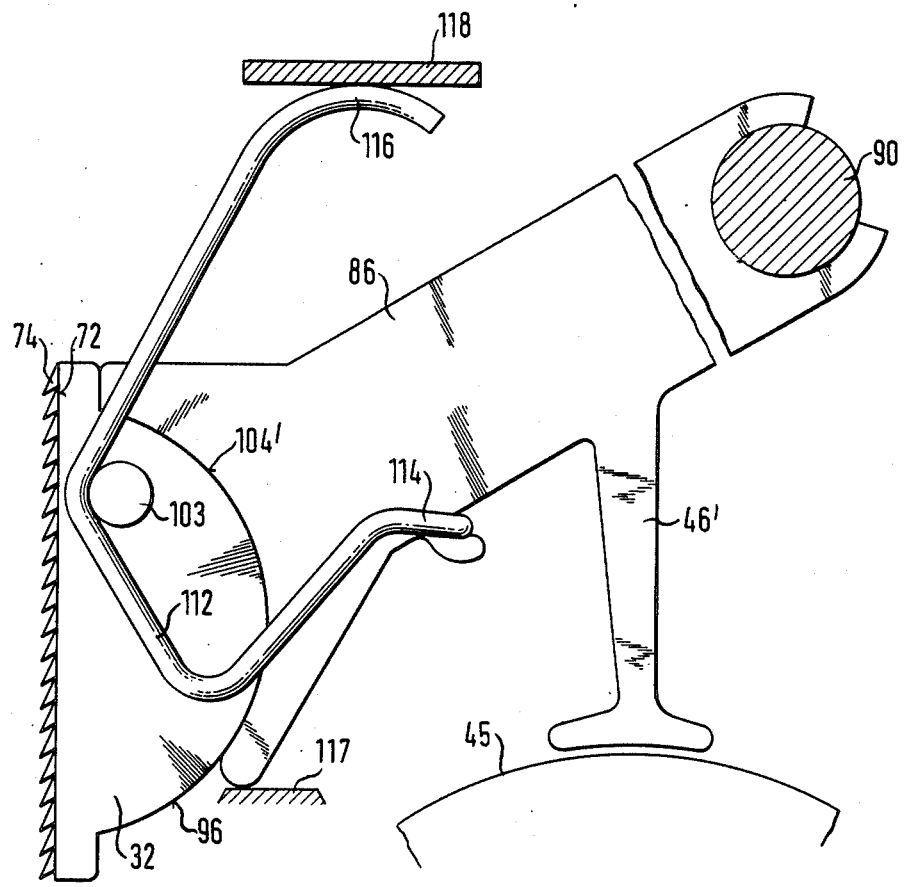

United States Patent [19]

Ernst et al.

[11] Patent Number: 4,687,253
[45] Date of Patent: Aug. 18, 1987

[54] SAFETY-BELT SYSTEM

[75] Inventors: Hans-Hellmut Ernst, Sülfeld; Edmund Lochbihler, Munich, both of Fed. Rep. of Germany

[73] Assignee: Britax-Kolb GmbH & Co., Dachau, Fed. Rep. of Germany

[21] Appl. No.: 811,683

[22] Filed: Dec. 20, 1985

[30] Foreign Application Priority Data

Dec. 21, 1984 [DE] Fed. Rep. of Germany ....... 3446857
Dec. 12, 1985 [DE] Fed. Rep. of Germany ....... 3543959

[51] Int. Cl.$^4$ .............................................. B60R 21/00
[52] U.S. Cl. .................................... 297/478; 280/806; 297/480
[58] Field of Search ....................... 297/476, 478, 480; 280/806

[56] References Cited

U.S. PATENT DOCUMENTS

| 4,323,204 | 4/1982 | Takada | 280/806 X |
| 4,429,920 | 2/1984 | Kondziola | 297/480 X |
| 4,451,062 | 5/1984 | Ziv | 280/806 |
| 4,544,112 | 10/1985 | Ziv | 280/806 X |

FOREIGN PATENT DOCUMENTS

| 2234157 | 1/1974 | Fed. Rep. of Germany . |
| 3001758 | 7/1980 | Fed. Rep. of Germany . |
| 3124188 | 1/1983 | Fed. Rep. of Germany . |
| 3330938 | 3/1984 | Fed. Rep. of Germany . |
| 2085709 | 5/1982 | United Kingdom . |

Primary Examiner—Kenneth Downey
Attorney, Agent, or Firm—Hoffmann, Dilworth, Barrese & Baron

[57] ABSTRACT

In a safety-belt system comprising a winding and locking mechanism, a clamping device is provided which carries out a clamping of the safety-belt outside the reel winding, wherein this clamping effect is caused by a lifting motion of the winding and locking mechanism or of a part thereof and is fastened by suitable means so that the load-bearing clamping organ comes to engage with its entire clamping surface on the belt and the approach of the clamping surface to the belt is synchronized. According to the invention clamping readiness of the clamping organ is begun on every vehicle deceleration of more than 0.45 g and on every belt withdrawal acceleration of more than 1.5 g. The belt winder contains, apart from the driving spring and the winding shaft, only the sensor and control mechanism, and does not require any separate locking elements in order to cause preblocking.

31 Claims, 25 Drawing Figures

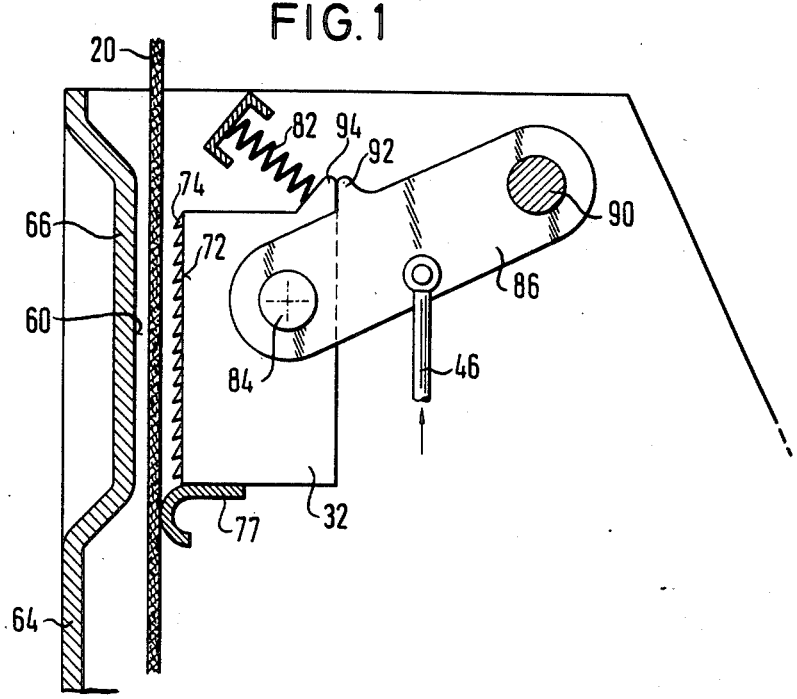
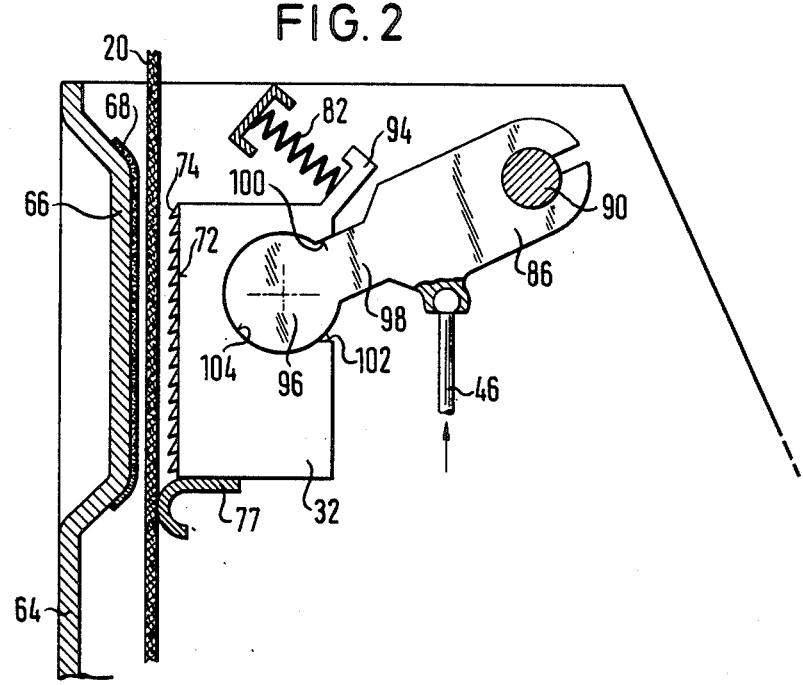

FIG.12
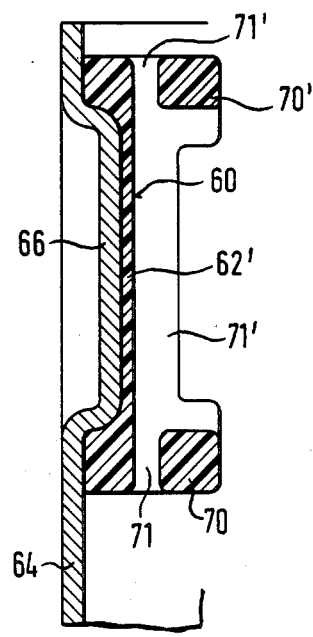
FIG.13
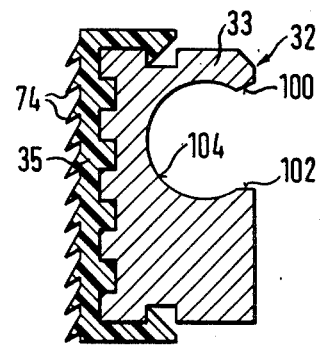
FIG.14a FIG.14b
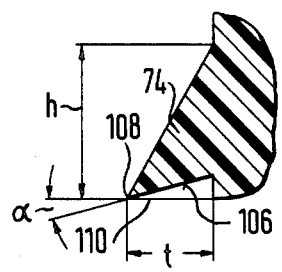 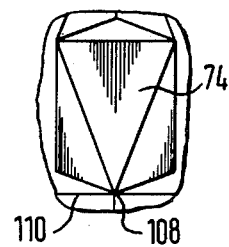
FIG.15
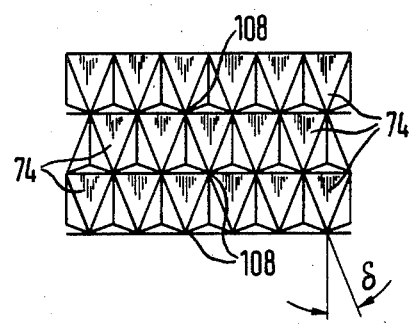

SAFETY-BELT SYSTEM

The invention concerns a safety-belt system comprising a winding and locking mechanism which has a sensing and control device and a clamping device having a controlled clamping portion for the prevention of further belt withdrawal from the winding and locking mechanism, in which the clamping portion is operatively coupled to respond to movement of at least a part of the winding and locking mechanism relative to the winder housing, for example a lifting or rotating movement of the winder reel, so that this relative movement effects the movement of the clamping portion into its clamping position.

When the safety-belt of a safety-belt system, for example for automobiles, is provided with a winding and locking mechanism, from which the safety-belt, after passing through a deflector as the shoulder belt or optionally as the lap-strap, engages on the body of a vehicle passenger, and for example in the event of a collision or other vehicle-determined deceleration, is abruptly decelerated, the body of the passenger in the vehicle presses against the safety-belt and attempts to withdraw it from the reel of the winding and locking mechanism. In this case however a rotary motion of the reel is prevented because the named locking mechanism comes into operation in controlled manner web-sensitively and/or car-sensitively. In such a case there is normally a so-called film reel effect which has the effect that the belt, when the reel is locked in the rotary direction and takes up the tensional load of the belt, can still be withdrawn to a certain extent because the belt windings on the reel slide and move closer together. The layers of the belt can move in relation to each other until the belt winding is firmly coiled. This effect causes a delayed response of the safety-belt which has a disadvantageous effect on the load level on the passengers.

To avoid this phenomenon, the safety-belt has already been placed around prepositioned deflector rollers, proceeding from the reel, which interact with a clamping jaw. But this deflection has the disadvantage of increased friction, especially when the safety-belt is withdrawn from the reel in order to fasten it. Already a proposal has been made for a clamping device in the area of the deflector fitting (GB-PS No. 2 085 709). The clamping effect is then set in motion by the pressure exerted by the body of the passenger in the vehicle on the safety-belt, whereby the clamping portion is located rotatably in an activated rocking lever.

From DE-OS No. 22 34 157 (FIG. 6) it is known that a belt clamping in the sense mentioned above should be undertaken by the displacement of the winding reel in combination with the load-absorbing locking of the belt winder. This displacement is transferred to a clamping portion designed as a rocking lever, whereby this clamping portion engages on a steel strip and clamps it firmly. However the clamping portion only comes to engage with the steel strip in accordance with a linear contact, which leads to an unfavourable introduction of forces to the effect that the clamping effect is inadequate. Moreover the reduction of comfort which results from the winding of a steel cable or of a steel strip is not acceptable for use in practice.

The most important performance feature of a clamp consists of the extremely short belt withdrawals when a tensional force is exerted on the belt, which exceeds the degree with which normally the belt can be withdrawn from the belt storage for corresponding comfort, in order for example to fasten the safety-belt or to carry out certain movements when the safety-belt is fastened in order to reach control elements in the automobile.

So-called winding clamps, i.e. clamps which interact with a winding and locking mechanism, are known for example from DE-OS No. 30 01 758, DE-OS No. 31 24 188 and from DE-OS No. 33 30 938.

Until now only the winding clamps according to DE-OS No. 31 24 188 and DE-OS No. 30 01 758 have been realized. But both the winding clamps have the following serious disadvantages. They require a strong belt deflection which amounts to twice 90° or 180° once. As a result unfavourable intake and withdrawal values are caused, meaning lack of convenience in operation. The named and known winding clamps all function so that for normal operation (CS=0.45 g, WS=0.5 g) a normal winder is caused to function with its blocking and/or locking elements and the belt clamping is only initiated when a higher load (e.g. in an accident) is present. This means that the resistance to the start of clamping is relatively great so that a certain load has to be applied by the blocking or locking elements.

Thus there is always a load-absorbing initial blocking followed later by the clamping caused by the winding clamp when increased tensional force is applied. This increased tensional force in connection with DE-OS No. 31 24 188 is approximately 200 to 250 N.

It is therefore the object of the invention to create a safety-belt system or a belt clamp in which with simple constructional means and good operating convenience, an extremely short withdrawal of the belt is guaranteed in the event of initiation by the sensor.

This object is solved according to the invention in that the clamping portion engaging on the belt is itself movable, in that the clamp blocking of the belt can be initiated by the clamping portion only directly via the sensor- and control-mechanism and without the intermediate use of a preblocking which absorbs a certain load, when the acceleration exceeds car-sensitively a lower limit value of for example about 0.45 g (CS) and when it exceeds web-sensitively a low limit value of approximately 1.5 g (WS).

For the first time a winding clamp is proposed by the invention which has absolutely no locking elements transmitting a certain load in an accident in the winder. The necessary resistance for the initiation of a clamp blocking by the withdrawal of the belt is applied by the sensor- and control-mechanism parts which are in any case present, which may consist of plastic parts and which absorb no substantial force. Thus for the first time a clamping technology is realized according to the invention which not only in an accident, i.e. when an increased load is present on the belt, initiates a clamp blocking but also brings the clamping mechanism into clamping readiness on every deceleration of more than 0.5 g car-sensitively (CS) and 1.5 g web-sensitively (WS). If for example a vehicle takes a curve with 0.5 g the sensor, for example a sphere, is deflected and raises a control pawl. Due to this fact alone clamping readiness is already ensured. If an emergency situation results from taking the bend—e.g. the vehicle falls into a ditch—the belt is withdrawn by the displacement of the passengers. This withdrawal of the belt now causes directly by means of the positively activated sensor- and control-mechanism a thrust on the winding reel and thus an approach of the clamping portion to the belt. The fact that even at low accelerations there is a compulsorily controlled clamping readiness (the positive association of the sensor via the control mechanism as far as the clamping portion) offers a guarantee of extremely short belt withdrawals in an accident because at minimal belt withdrawal forces a direct clamping of the belt is then initiated. Thereby a film reel effect which is measurable even at small belt forces can be prevented a priori.

In an advantageous embodiment a return spring of the clamping portion is adjusted as to its resilient force to be only strong enough for the named clamp blocking to be directly initiated at the named low acceleration value.

Expediently a rocking lever arranged opposite the belt and loaded by pressure is provided with a rotatable clamping part. To carry out whole-surface engagement of the clamping surface of the clamping portion on the belt the clamping portion can be rotatably mounted in the pivotal portion with a frictional resistance such that the clamping portion, after the initial engagement of its clamping surface on the belt, adopts an angular relative position to the rocking lever and maintains said angular relative position such that the clamping part always comes into contact with the belt over its entire clamping surface. This causes a protective clamping engagement.

In order to ensure a further improved protective engagement between the clamping portion and the belt, the transmission of motion between the rocking lever and the locking mechanism or winding mechanism which initiates this motion is designed so that the clamping surface of the clamping member moves during the approach to the belt in the same directional components as the movement direction of the belt, at the same speed as the belt. The result is that no relative movements occur between the clamping surface of the clamping portion and the belt, which could lead to damage to the belt which in certain circumstances always occurs at substantially the same point.

The movable clamping portion is provided on its clamping surface with a plurality of gripper teeth. The clamping portion can consist of a load-absorbing body and an advanced plate which carries the gripper teeth. This provides the possibility of adapting the gripper surface in terms of its material to the respective conditions, especially with respect to the design of the gripper teeth, for example when the plate which supports said gripper teeth has been designed as an injection-moulded part made of a corresponding plastic material. The clamping part itself then can be made of a material such that it resists the correspondingly initiated forces.

The points of the gripper teeth should preferably be aligned against the withdrawal direction and towards the belt surface so that an especially effective engagement of the gripper teeth is provided. For the efficiency of the gripping process or of the clamping process it is important that the back taper surface of the gripper teeth forms a particular angle to the normal on the belt surface. This angle should preferably be from 3° to 10°.

The height of the gripper teeth is also of great importance; if it is to be designed as two thirds of the belt thickness (=0.8 mm in height with a belt thickness of 1.2 mm), this ensures that the teeth do not penetrate fully under load (and when the belt is compressed) and thus come into contact with the counter-pressure surface.

Figure 7:
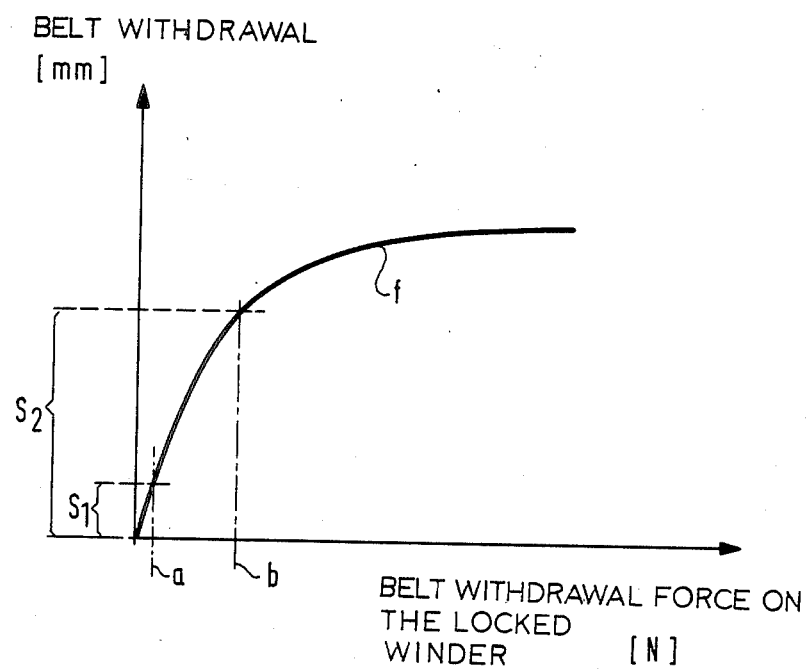

The gripper teeth can expediently have an asymmetrical pyramidal form and the points of the gripper teeth can be offset in rows of teeth behind each other whereby the defined angle δ shown in FIG. 7 amounts to about 20°.

Especially it is an advantage if the design, alignment and arrangement of the gripper teeth are adapted to the respective structural composition of the belt, especially with respect to the spacing of the rows of teeth from the position of the weft and warp threads of the fabric of the belt. In particular the spacing of the rows of teeth corresponds to the spacing of the weft.

In order further to increase the engagement between the clamping surface provided with teeth and the belt with the maximal protective clamping of the belt, the gripper teeth are aligned in a plane which is parallel to the belt surface at an acute angle to the direction of movement of the belt, preferably at an angle of 20°. When in this connection a space is provided perpendicularly to the direction of movement of the belt in the clamping surface plane, this leads to a semi-form-locking of the teeth with the load-absorbing warp threads, because these threads are inserted in meandering fashion between the teeth and can squeeze into the free spaces.

When the tooth height of the gripper teeth increases in the direction opposite to the withdrawal direction of the belt, wherein the first three rows can be increasingly smaller than the other teeth, the gripper teeth in the named direction in the first row having a height of 40%, those of the second row having a height of 50%, those of the third row a height of 60% and those of the remaining rows having a constant height of two thirds of the belt thickness, the result is a higher load capability in an accident at the point of major load impact. The width of the clamping surface occupied normally by the gripper teeth can be designed to decrease in the direction of belt motion in the longitudinal direction of the belt.

The clamping portion can have on its edges a thinning of the material so that the clamping portion adapts by bending at this point to the inevitable curvature of the counter-pressure side plate. This causes a more even force effect on the belt at high loads, combined with protection of the edges, while there is no inclination for locking at this point.

Advantageously in the clamping surface of the clamping portion equipped with the gripper teeth a projection strip of rubber or similar material is inserted, which extends in the direction of movement of the belt over the entire clamping surface. This strip comes initially into engagement with belt and is then deformed under a certain force so that the teeth themselves can engage. An especially favorable engagement results when in this connection the counter-pressure surface in the direction of the belt is designed in the form of a sphere. When higher forces are applied, this spherical body is deformed so that a flat counter-pressure surface comes into operation.

Owing to the further embodiments of the invention described above, not only is the design more simple because of the smaller number of parts, the manufacture more economical and the reliability increased, but there is also a faster conversion of the sensor pulse into the clamping of the belt while avoiding load-absorbing preblocking caused by extra locking elements, and with far reaching protection for the belt by the clamping process even when the inventive clamp causes a clamping in the belt on every sensing (CS=0.45 g and WS=1.5 g), which during the use of the safety-belt is estimated to take place about a thousand times and during the acceptance and release duration test 20,000 times. This is realised in particular in the sense of the further development of the doctrine in claim 1 by the named embodiment of the gripper teeth (geometric data) in connection with the self-adjusting clamping portion and the synchronized approach of the clamping portion to the belt. In this connection it should again be noted that the winder contains no extra locking or blocking elements among the clamping mechanism, but that a sensor activation is directly converted by the control mechanism into clamping or clamping readiness. The clamping of the belt is done with such care that even after 20,000 clamps it is still in a position to absorb the full load of the accident in a crash.

For an especially compact and simple design of the parts the movable or rotatable clamping portion mounted on the rocking lever and the rocking lever itself can be designed as aluminium injection-moulded parts or as plastic injection-moulded parts. In this connection it is an advantage if the rotary axle is designed as an integrated component of the movable clamping portion or of the rocking lever, and subsequently a corresponding recess is formed for the acceptance of the rotational axle by the corresponding other part. In this connection with a corresponding design the opening edge of the recess can form the retainer stop. The parts are then preferably parts made from extruded profiles.

With this compact and simple design of the parts the rotational axle is preferably a pitch-cylindrical rod and the recess is preferably a hollow cylinder which is correspondingly adapted, is open at at least one end and has a longitudinal slit. This has the consequence that the parts can be simply assembled, in that the pitch-cylindrical rod is inserted from the open side of the hollow cylinder into the latter along the rotational axis. Thus an axle is not required as an extra component.

In order that the clamping portion can absorb higher forces without the danger of fracture, said clamping portion is provided with a pivotal bearing which is arranged opposite to the clamping surface, is convexly curved, spherical or pitch-cylindrical and which has a partial peripheral extension equal to or less than 180° and engages with a concave pitch-cylindrical pivotal bearing surface of the rocking lever, whereby a clamping portion spring mounted on the rocking lever engages on the rocking lever. Thereby the clamping portion spring can be guided to a point of engagement on the clamping portion and thus can be supported on a fixed housing point. Thus this spring has a double function; on the one hand it holds the clamping portion together with the named bearing surfaces. On the other hand the spring serves to detach the clamping portion from engagement with the belt, when clamping is no longer desired.

When the spring holding the clamping portion engages at a point on the clamping portion which is on the rotational axis of said clamping portion, the spring does not exert any torque on the clamping portion so that with a corresponding design of the frictional resistance between the clamping portion and the rocking lever, the clamping portion can adopt the desired rotational position without being adversely affected therein by the spring which holds the clamping portion on the rocking lever.

For a short and economical as well as light design of the axle of the rocking lever without special securing parts as well as for low-friction fixation of the rocking lever without lateral chafing on the housing, a further embodiment of the invention is characterized in that the rocking lever is mounted by means of an axle in parallel housing walls without contact with the latter and in a housing cover a centre-fixing projection is provided which engages in a corresponding recess in the rocking lever, and in that the axle is secured against axial displacement through said housing cover. For the lightest possible and most economical design of the rocking lever and for simultaneously easy assembly, the rocking lever is further designed so that it has on both sides and integrated with it bearing pins which are provided with bevels and can be locked into corresponding bores of parallel housing walls by spreading said walls apart, and in that these housing walls are connected by a subsequently mounted spacer which ensures the desired spacing.

In order that the pins can better latch into the wall apertures when the housing walls are spread out, after the latching-in process a bushing is inserted from the outside respectively in the subsequently larger apertures, and the pins in fact are supported in said bushing. These bushings can have a special surface and thus provide better bearing properties.

In order to be able to design better the named synchronization effect and the corresponding transmission conditions for the transmission of movement and the rocking lever, between the winding and locking mechanism which starts the named movement of the rocking lever and the rocking lever itself, a rotatably mounted actuating lever is arranged on the housing side, which lever permits in its idle position free rotation of the winding and locking mechanism. A corresponding transmission condition can also be attained by the design and arrangement of a plunger on the rocking lever.

The named guidance for the belt between the clamping portion and the winding and locking mechanism as well as on the side of the clamping portion opposite the winding and locking mechanism ensures that the belt is quite definitely guided in the clamping area, independently of the coil diameter or of the direction of withdrawal of the belt, so that in the idle position it does not come into contact with the gripper teeth.

The invention will be explained below in more detail on the basis of the embodiments which are shown purely schematical in the drawings. These show:

FIG. 1 a clamping device with a rocking lever and a clamping portion rotatably mounted on said lever.

Figure 4:
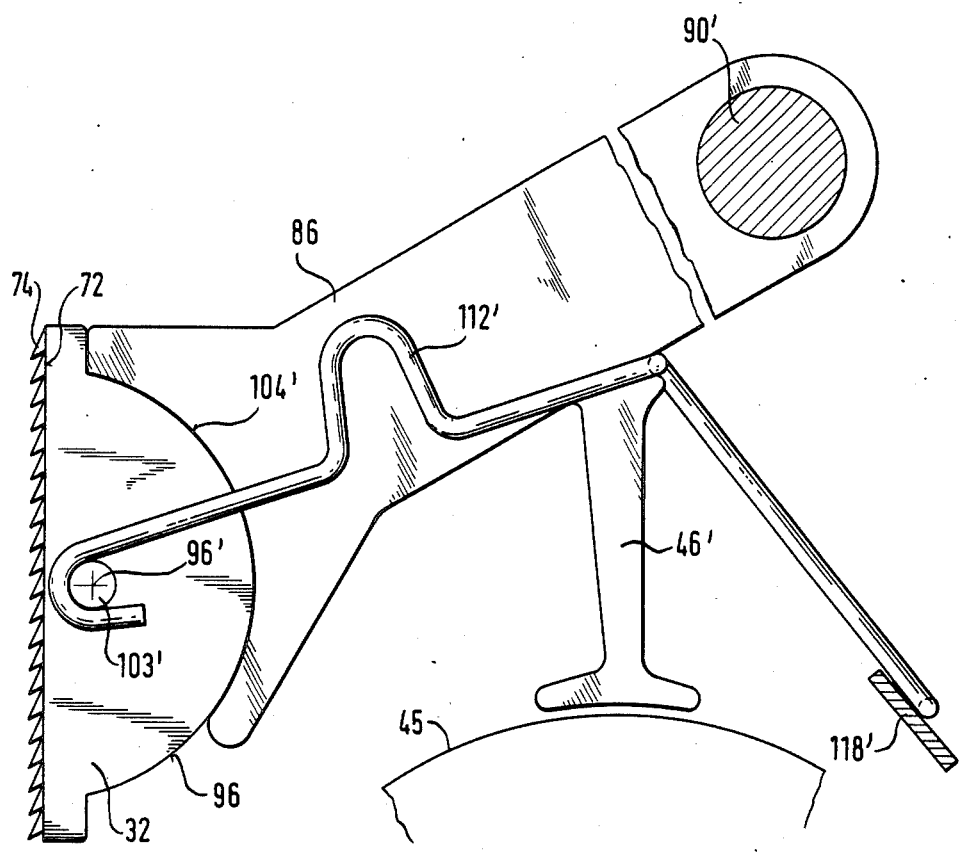
Figure 5:
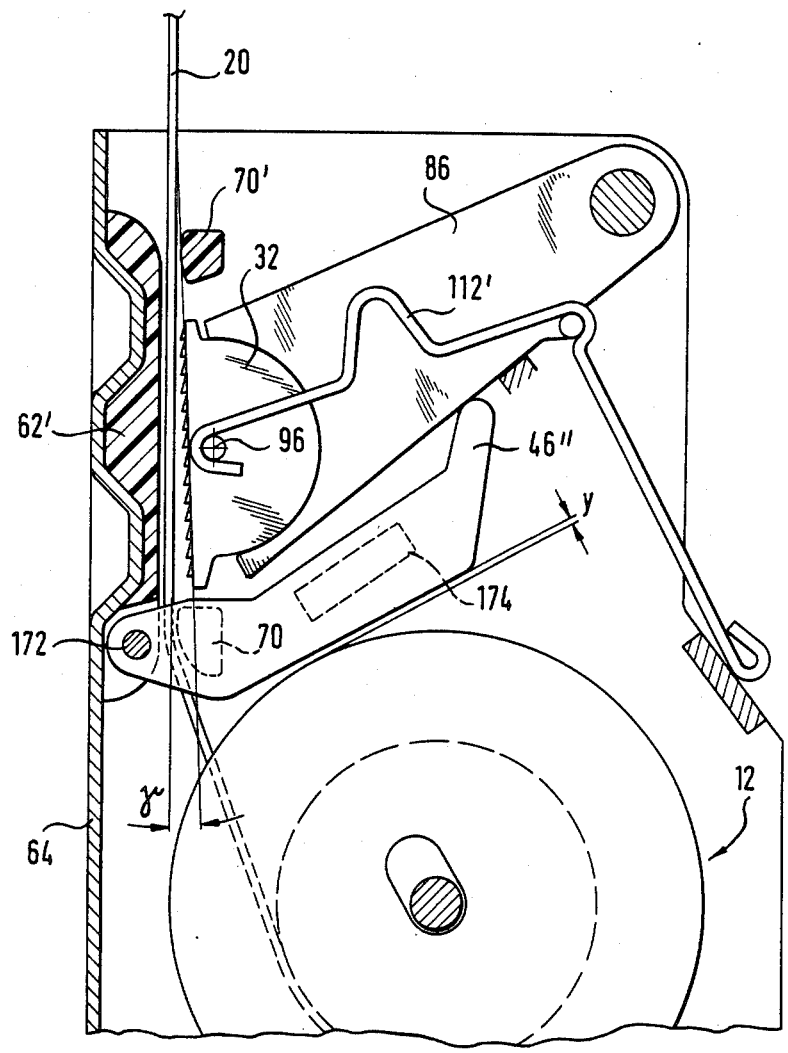
Figure 6:
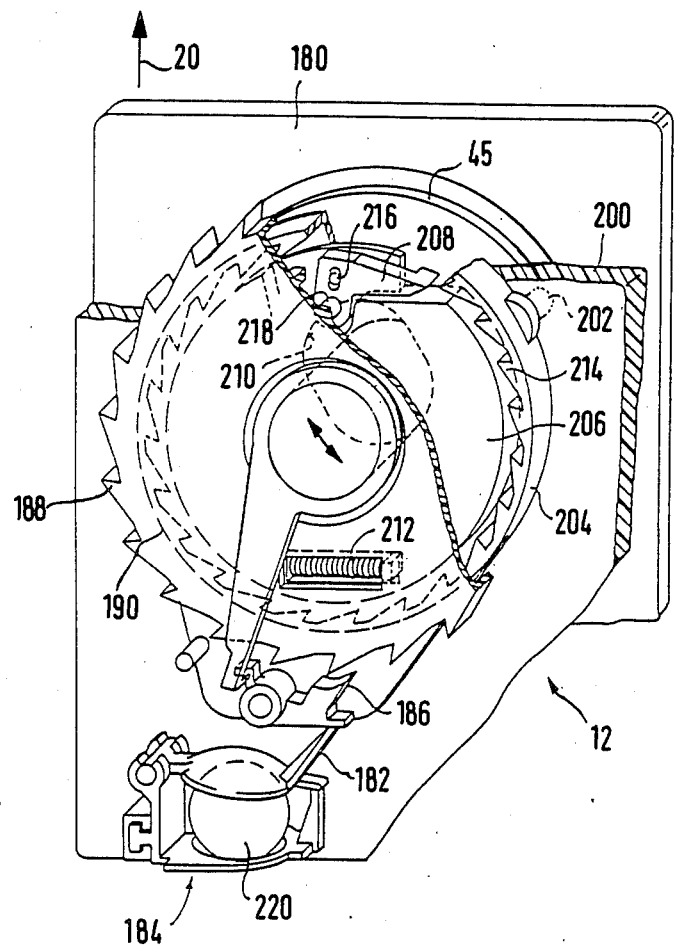
Figure 8:
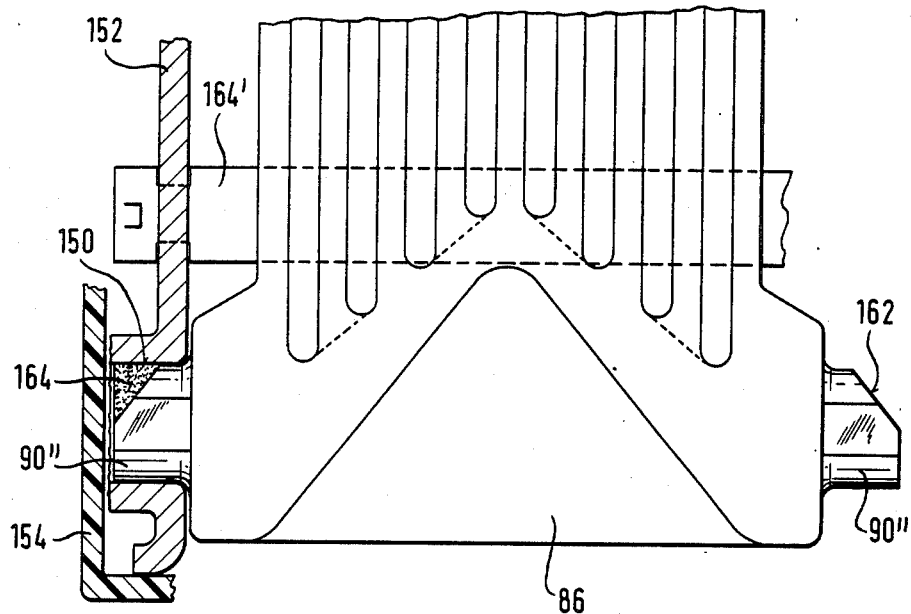
Figure 9A:
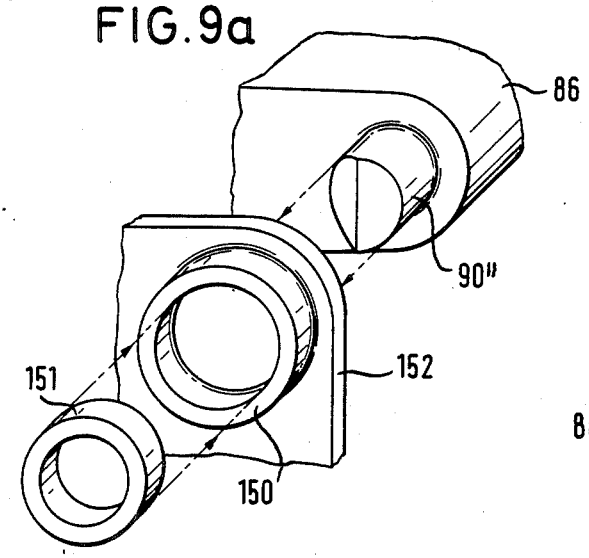
Figure 9B:
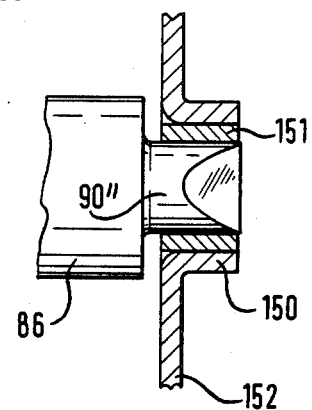
Figure 10:
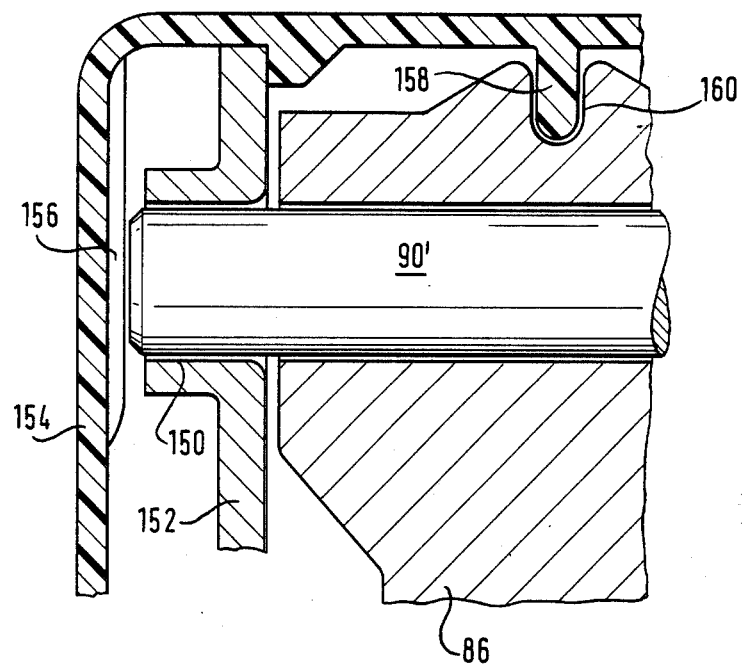
Figure 11A:
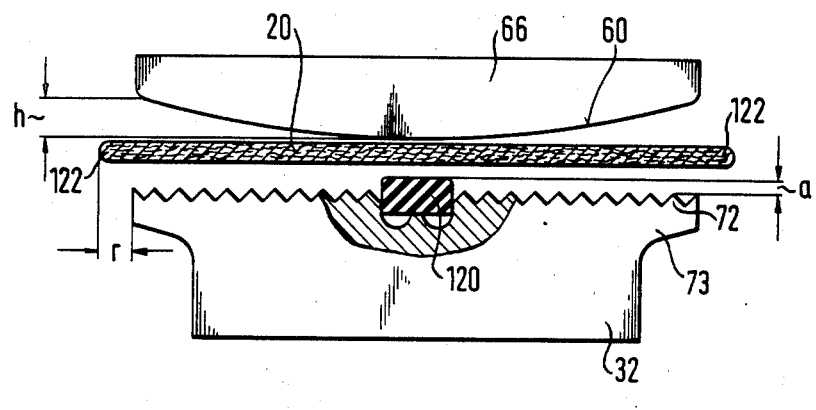
Figure 11B:
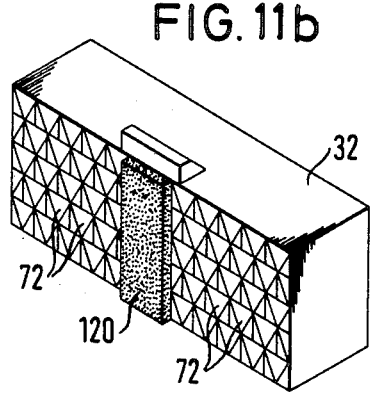
Figure 16:
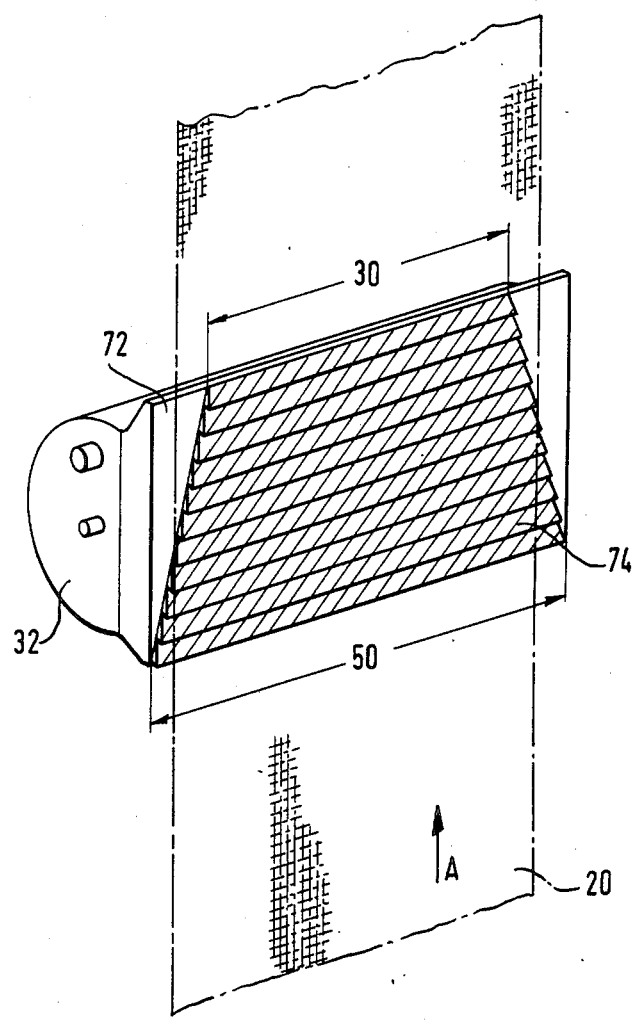
Figure 17A:
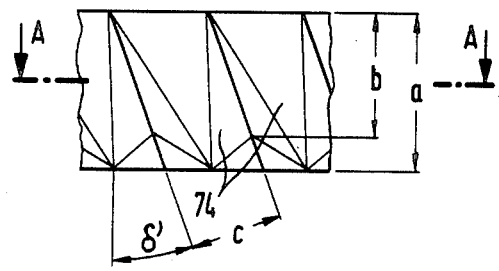
Figure 17B:
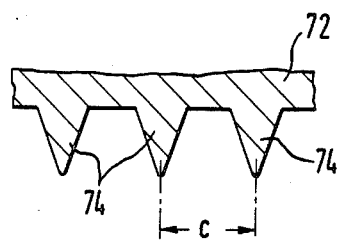
Figure 17C:
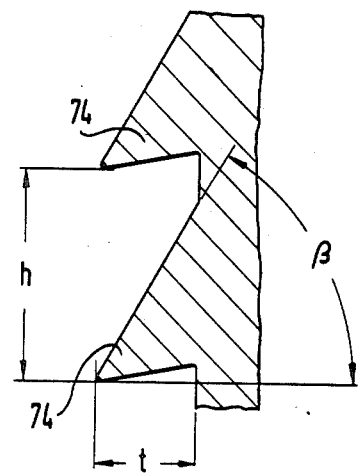
Figure 18:
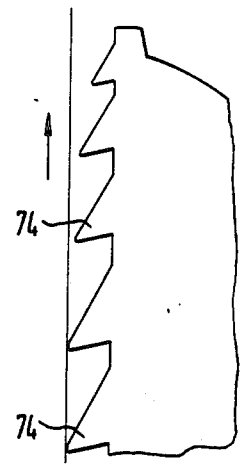
Figure 19A:
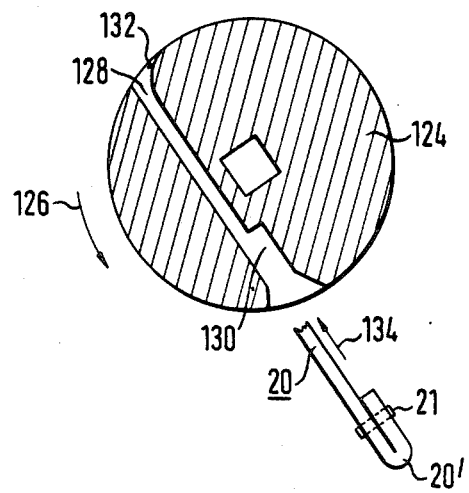
Figure 19B:
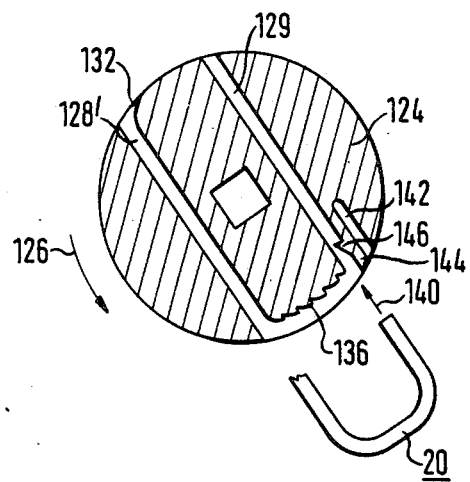

FIG. 2 a view comparable to FIG. 1 of a modified clamping device of integral construction, FIG. 3 a detailed view of another modified clamping device in which the clamping portion is pressed by a spring against a stop into its initial position, FIG. 4 a view similar to FIG. 3, however showing a modified embodiment in which the spring engages in the rotational axis area of said clamping portion, FIG. 5 a schematic sideview of another type of actuation of the rocking lever of the clamping device by means of the winding and locking mechanism which is shown here only schematically, FIG. 6 a more detailed perspective view of a winding and locking mechanism without preblocking, which is equipped with a car-sensitive and web-sensitive sensor, FIG. 7 a diagrammatic illustration of the belt withdrawal in relation to the belt withdrawal force, FIG. 8 a plan view of a part of the bearing of the rocking lever in the housing, FIG. 9a a perspective exploded view of a part of the bearing of the rocking lever in the housing, FIG. 9b a sectional view through the bearing area shown in perspective in FIG. 9a, FIG. 10 a partial sectional view through another embodiment of the pivotal bearing of the rocking lever, FIG. 11a a sectional view through the clamping area, FIG. 11b a perspective view of the clamping surface of the clamping portion with an inserted rubber strip, FIG. 12 an individual sectional view of the counter-pressure surface, FIG. 13 another embodiment of the movable clamping portion, FIG. 14a a sectional view through a gripping tooth, FIG. 14b a plan view of a gripping tooth, FIG. 15 a plan view of a row of gripping teeth of the clamping surface of the movable clamping portion, FIG. 16 a perspective view of the clamping surface of the clamping portion of a special tooth arrangement, FIG. 17a a perspective view of a gripping tooth with another alignment, FIG. 17b a partial sectional view through the tooth arrangement according to FIG. 17a, FIG. 17c a sectional drawing through the gripper teeth in the direction of movement of the belt, FIG. 18 also a sectional drawing through the gripper teeth in the belt movement direction, but with another tooth height arrangement, FIG. 19a a cross-sectional view through a winding reel core of the winder with a type of fastening for the belt, and FIG. 19b also a cross-sectional view through the core of the winding reel of a winder with another type of fastening.

The clamping device shown in FIG. 1 consists of a rocking lever 86 which is mounted on a pivot axle 90 fixed in a housing. On the end of the rocking lever 86 opposite to the pivot axle, on a rotational axle 84 a clamping portion 32 is rotatably mounted which is pressed by return spring 82 acting on a stop 94 of the clamping portion 32 against a retainer stop 92 of the rocking lever, and thus is held in a certain starting position. On the end of the rocking lever 86 opposite the retainer stop 92 there is a control rod 46 which is actuated in the direction of the arrow in FIGS. 1 and 2 to cause the clamping portion 32 to engage on the belt 20. In the starting position the clamping portion 32 abuts a stop 77 which is also designed as a guide for the belt.

Opposite the clamping portion 32, but on the other side of the belt 20, there is a counter-pressure surface 60 which is formed by a reinforcing fin 66 of the housing wall 64, and said counter-pressure surface 60 preferably has a surface with an especially low frictional coefficient. This assists the detachment of the safety-belt 20 after the completion of a clamping process. According to FIG. 2 on the inside of the reinforcing fin 66 a strip of material 68 is applied, which for example is a polytetrafluorethylene strip with an especially low frictional coefficient.

The clamping portion 32 is provided on its clamping surface 72 with a plurality of gripper teeth 74.

The advantage of an axle 84, 96 consists of its full adaptability to the real inclination of the counter-pressure surface 60, so that under load it is independent of tolerances and deformations.

The initial idle position of the clamping portion 32 shown in FIGS. 1 and 2 can be adjusted so that in this idle position, the clamping surface 72 adopts a preset angle to the belt in the direction of movement of the belt such that when the clamping portion 32 swivels onto the belt, the entire clamping surface immediately engages with the gripper teeth on the belt.

The embodiment according to FIG. 2 differs from that in FIG. 1 in that the rotational axle 84 is designed as a part circular-cylindrical integrated portion 96 of the rocking lever 86 which is connected by means of a neck 98 with the actual body of the rocking lever 86. This neck 98 forms the retainer stop on which a stop face 100 engages. This stop face 100 is formed by an aperture slit edge 102 which defines a hollow cylindrical recess 104. This recess 104 is open at least on one longitudinal end so that the rotational axle 96 can be inserted from that side into the recess.

A special embodiment of the movable clamping portion 32 is shown in FIG. 3. According to this embodiment the clamping portion is designed in two parts and clamping portion 32 consists of a load-absorbing base body 33 and a prepositioned tooth plate 35 with the teeth 74. These teeth 74 are shown in more detail in FIGS. 14a, 14b and 15.

Corresponding to the illustration in FIG. 3 the rocking lever 96 which is pivotable around the pivot axle 90 is provided with an integrated plunger 46' which normally is spaced at about 0.3 to 0.5 mm from the actuating reel 45 of the winder, so that with normal belt withdrawal the latter is freely rotatable when the rocking lever engages on a stop 117 located on the housing side. On the end of the rocking lever 86 opposite the pivot axle 90 the rocking lever 86 is provided with a concave part circular-cylindrical recess 104'. This recess engages with a convex part circular-cylindrical elevation of the clamping member 32, wherein the peripheral extension of this circular, elevation 96 is equal to or less than 180°. Therefore normally the clamping portion would drop out of the recess 104'. To avoid this, the clamping portion is provided on both sides with a pin 103 around which a clamping portion spring 112 is placed which is secured at one end 114 on said rocking lever and is supported at the other end 116 on a housing portion 118. This support on the housing portion causes a prebias such that after the clamping the rocking lever 86 can be released from clamping engagement with the belt. This spring performs a double function. The convex design of elevation 96 has the effect that the clamping portion or the clamping surface can be aligned precisely with belt. It is self-adjusting, especially when deformation occurs under load. This adjustment capability ensures that the clamping pressure is optimally distributed over the entire clamping surface.

Although this is not shown, the plunger 46' can also be designed as a disc which can roll on the reel 45 in order that there is less frictional wear, when this disc is rotatably mounted on the rocking lever.

The embodiment according to FIG. 4 differs from that in FIG. 3 in that not only is the clamping portion spring 112' secured on another point of the housing, but also this spring engages on the clamping portion on an axle stub 103', where the rotational axle 96' of clamping portion 32 is located. Thus clamping portion spring 112' performs only one function which is to keep the clamping portion 32 in the depression 104' of the rocking lever 86. Between the depression surface 104' and the surface 96 of the clamping portion there is a friction such that the clamping portion 32 remains after one rotation and after the subsequent release in the corresponding position, without the clamping portion spring exerting a counter-torque on the clamping portion. This provides the possibility of adjusting the clamping portion at first at one's own discretion. On the first approach of the clamping portion 32 to the belt, said clamping portion aligns itself automatically so that the entire clamping surface 72 with its teeth 34 engages fully and over the entire surface on the belt. If now the rocking lever 86 moves away again with clamping portion 32 from the belt, the clamping portion 32 remains at such an angular relative position to the pivot portion 86 that on a renewed pivoting of the pivot portion 86, the entire clamping surface engages simultaneously on the belt. Naturally there is also the possibility, depending on the starting position of rocking lever 86 of presetting a defined angular position so that this result is achieved.

As stated earlier, the inducement to movement on the rocking lever 86 should be effected so that the clamping portion 32 moves with respect to the movement component in the tensional direction of the belt when it is approaching the belt at the same speed as the belt. Owing to this synchronization effect, there is no relative movement between the tooth gripping surface of the clamping portion 32 and the belt, which results in a very low-wear engagement with the belt.

In order to have greater variety in the design of the transmission ratio for the rocking lever to attain the synchronization effect, the actuating element for cooperation with the winding and locking mechanism 12 is not integrally connected with the rocking lever 86 as shown for example in FIG. 3. Instead according to FIG. 5 for example two actuating levers 46" are pivotably mounted on the housing side in the bearing 172, the levers being interconnected by a rod 174 which is shown as an interrupted line. Due to the design of this actuating lever the leverage conditions can be precisely adjusted. In the basic position of actuating lever 170 there remains a play y of about 0.5 mm against the winding and locking mechanism so that in normal operation the latter can rotate freely. In FIG. 5 the angle γ makes clear the preset angle of the clamping surface of the clamping portion 32 in the starting position so that when the clamping portion is pivoted to the belt, the entire clamping portion always engages with said belt.

The angle of the rocking lever and clamping portion to the direction of movement of the belt is also of importance. In order to achieve an optimal and efficient self-reinforcing effect, this angle should be adjusted in a range from about 20° to 40°. This is the angle between the normal through the pivot axis of the rocking lever to the belt and the line through the pivot axis of the rocking lever and the clamping surface of the clamping portion. If the angle is too large there is no self-reinforcing effect and the belt slippage results. Very high friction is necessary in the clamping portion surface to be able to achieve clamping at all, although no problems are caused during deblocking and lower pressure forces are developed. If on the other hand the angle is too small, there is a very good self-reinforcing effect and no belt slippage. Moreover no great friction is necessary in the clamping surface. However, substantial problems arise during deblocking and very high pressure forces are developed so that the rocking lever which acts as a pressure lever clamps fast.

The lower and/or the upper belt guides 70, 70' can also be designed as rollers in order to reduce the friction.

FIG. 6 shows an example of a winding and locking mechanism as belt storage. One sees particularly well the composition of the control parts, wherein the illustration is limited to a lefthand frame leg 180 and the adjacent guided left flange 45 of the shaft. Here the belt winder is shown in the idle position. A pulse lever 182 of the car-sensitive sensor 184 (CS) is located on the lower side of a control pawl 186 which can engage in an outer indentation 188 of a control wheel 190. The gear rim which is present on the shaft indentation and which otherwise in the idle position is not engaged with an indentation on the housing side is not present and nor is the indentation on the housing side. The indentation on the draft side is replaced in this case by the disc 45 which actuates the plunger 46 or 46'. A mechanical base plate 200 in which a bearing pin 202 is located as a rotation point for a control disc 204 is shown by an interrupted line. The entire control disc 204 with the control wheel 190 which is guided therein and a intermediate control disc 204 and an inertial disc 206 which is arranged on control wheel 190 is raised after locking has taken place between control disc 204 and control wheel 190 which can optionally be initiated either by the car-sensitive control pawl 186 or by a web-sensitive pawl 208, in order to raise the bearing pin 202 in its longitudinal slot 210 in the mechanical base plate 200 out of the idle position shown in FIG. 2, in order to raise the rocking lever 86 and thus the clamping portion 32 by means of the disc 45 and the plunger 46 or 46' and thereby to bring the clamping surface 72 into engagement with the belt 20. This means that no preblocking takes place in the belt winder 12, but only an immediate activation of the clamp by the named lifting movement.

The compression spring 212 which is located between the intertial disc 206 and the control wheel 190 in a corresponding recess, ensures that in the idle position according to FIG. 6 the web-sensitive pawl 208 remains disengaged from the internal indentation 214 of the control disc 204. Only when as a result of belt withdrawal exceeding a certain extent, the inertial disc 206 remains in its movement behind the movement of the control wheel 190 is a relative movement achieved between inertial disc 206 and control wheel 190 by overcoming the force of the compression spring 212, owing to which relative movement the pawl pivots outwardly into the internal indentation 214 of control disc 204 due to the mutual offsetting between a pin 216 on the interial disc 206 and a bearing pin 218 on control wheel 190.

Thus the belt winder in FIG. 6 incldues a car-sensitive sensor having a sphere 220 and a web-sensitive sensor which can take effect independently of each other.

As already stated, the fact that a compulsorily controlled clamping readiness is present even at low accelerations provides the guarantee of extremely short belt withdrawals in an accident because with the lowest possible belt withdrawal forces a direct clamping of the belt is initiated. Thereby a film reel effect, which is measurable even with small belt forces, can be prevented from the start. This is not the case in the winders proposed in the prior art since they only initiate the clamping of the belt when a high belt force is present. This means inevitably that they already allow a relatively large share of the film reel effect before they safety clamp the belt. This emerges from the diagrammatic illustration in FIG. 7. FIG. 7 shows the belt withdrawal depending on the belt withdrawal force F on the locked winder through the curve f. The interrupted line b shows the conditions corresponding to the prior art and the dotted line a shows the conditions according to the present invention. In the case of the prior art and in accordance with the interrupted line b, the clamping only takes place at an increased belt withdrawal force, so that due to the film reel effect a belt withdrawal of the magnitude S 2 has taken place by that time. However, in the case of the invention the clamping takes place already at point a, directly after the activation of the sensor and control portions without any previous load-absorbing blocking in the winder, so that a belt withdrawal takes place at only in order of magnitude of S 1.

The rocking lever 86 of the embodiment in FIG. 10 has a single continuous axle 90'. This axle is supported on both sides, of which only one side is shown in FIG. 10, in apertures 150 of the housing walls 152 which are substantially parallel to each other. The securing axially of the axle 90' is performed by a housing cover 154 which prevents by means of ribs 156 any axial motion of the axle. The cover is also provided in the centre with a centre-fixing projection 158, which engages in a centrally located and adapted recess 160 of the rocking lever 86. Thus it is not necessary to provide additional parts to fix the position of the axle. Corresponding to the drawing in FIG. 8, rocking lever 86 is provided at both ends with a bearing pin 90'' which is cast on. This bearing pin has an inclination 162 which is also pivotably supported in apertures 150 of the parallel housing walls 152. For assembly the housing walls 152 are spread slightly apart which is supported by the inclination 162 when the rocking lever 86 is inserted with its pin through the walls so that the bearing pins 90'' latch in the apertures 150. In order to maintain a desired spacing between the parallel walls, without the rocking lever grating on the housing, after inserting the rocking lever 86 between the walls, a spacer 164 is inserted.

When a cover 154 of the housing is placed outside the apertures 150, the space 164 formed by the inclination 162 can be used as a store for lubricants.

According to FIG. 9a and 9b a bushing 151, optionally a steel bushing, must be inserted between the opening 150 and the bearing pin 90''. When this steel bushing is inserted only after the latching in of the bearing pin 90'', this leads to easier assembly of the rocking lever 86. In addition the bearing conditions can be better arranged by the corresponding choice of the material of the bushing. From FIG. 11a and 11b it can be seen that a strip 120 of rubber or similar material is inserted in the clamping surface 72 of the clamping portion 32. As shown in FIG. 11a this rubber strip projects at a certain distance a above the teeth of the clamping surface 72 and extends in the direction of movement of the belt over the entire length of clamping portion 32 as is clearly shown in FIG. 11b. The central position of the strip has the result that it is only necessary to assemble one rubber strip. In any case the belt at first only comes into contact with strip 120 and only after it has been deformed, with the teeth of the clamping surface 72. A very effective clamping results when a counter-pressure surface 60 on the opposite side is made slightly spherical. At a correspondingly strong clamping force this spherical portion becomes deformed, providing an even flat counter-pressure surface. The spherical portion can be made so that on the width of the counter-pressure surface a spherical portion height h of 0.2 mm is provided, as shown in FIG. 11a.

As can also be seen from FIG. 11a, the edges 122 of the belt 20 project by an amount r over the lateral limit of clamping surface 72 so that the critical edges of the web-belt 20 are not adversely affected by the clamping pressure. The clamping portion 32 has laterally deformable lateral zones 73 which can adapt to the deformation.

FIG. 12 shows a special embodiment of the part 62' which forms the counter-pressure surface 60 and is applied on the housing. This part 62' forms a guide 70 on the entryside and a guide 70' on the exitside for the belt, whereby a lateral guide portion 71' extends between the two guides. The entry slit is marked 71 and the exit slit is marked 71'.

FIG. 13 shows a special variant of the movable clamping portion 32. Here the clamping portion is formed in two parts and clamping portion 32 consists of a load-absorbing base body 33 and a prepositioned tooth plate 35 with gripper teeth 74. These gripper teeth 74 are shown in more detail in FIGS. 14a, 14b and 15.

The design of the gripper teeth is of special importance for the efficiency of a fast and protective clamping engagement with the safety-belt itself, both with respect to choice of material as well as to dimensions and the arrangement of the gripper teeth. Corresponding to the drawing in FIGS. 13 to 15, the gripper teeth are swept back against the direction of movement of the safety-belt, i.e. the points of the teeth are directed onto the belt surface and contrary to the direction of belt withdrawal. Corresponding to the illustration in FIGS. 14 and 15 these gripper teeth have an asymmetrical pyramidal form. These pyramidally shaped gripper teeth are arranged in conformity with the drawing in FIG. 15 so that the points of the teeth are arranged offset against each other in the rows of teeth. This is done particularly in adaptation to the special composition of the fabric of the safety-belt.

The dimensioning of the gripper teeth is of special importance. Thus it is been found advantageous if the back taper surface 106 of gripper teeth 74 adopts an angle $\alpha$ from 3° to 10° with the normal 110 to the belt surface. The depth t of the tooth amounts to about two thirds of the belt thickness and the tooth height h corresponds to the weft spacing of the webbed belt. This has the result that the teeth engage in a particularly favorable manner between the warp and weft threads and thereby the fabric of the belt is only slightly stressed. This makes it possible for more frequent clamping engagement to take place without damaging the belt.

Since the force engagement between clamping portion 32 and clamping surface 72 or the toothed area 74 is largest in the belt withdrawal direction A on the exitside end of the clamping surface and is smallest on the entry end, the clamping surface has preferably a contracting width in the direction of belt withdrawal as shown in FIG. 16, the width on the entryside being preferably somewhat larger than the width of the belt 20. If for example the has a width of 46 to 48 mm, the width on the entryside should preferably be 50 mm and on the exitside it should be 30 mm. Owing to this design a more even loading of the belt and thus a higher loading capability are achieved.

Preferably about 400 gripper teeth are used for the clamping portion. The clamping surface has an area of about 25×45 mm.

In FIG. 15 the gripper teeth are aligned against the direction of belt withdrawal and in plan view towards the clamping surface plane of clamping portion 32 on a line parallel to the direction of belt withdrawal. Corresponding to FIG. 17a the individual gripper teeth 74 are aligned at an acute angle δ' of about 20° to the direction of movement of the belt against the belt withdrawal direction, only one tooth being shown in FIG. 17a. According to FIG. 17b in the direction normal to the direction of belt movement and in the clamping surface plane there are spaces x between the teeth 74. Because of the offset arrangement of the teeth, these spaces allow a semi-form-locking between the warp threads of the belt and the gripper teeth of the clamping surface, in that the warp threads meander between the teeth and latch into them.

For example the teeth have the following dimensions. Dimension a amounts preferably to about 1.7 mm depending on the webbing of the belt, dimension b is about 1.5 mm and dimension c is approximately 0.6 to 0.8 mm. The tooth spacing c in FIG. 17b is about 1.5 mm, the tooth height h is in the tensional direction of the belt according to FIG. 17c about 1.7 mm. The angle β in FIG. 17c is preferably 60° and the tooth height t normal to the clamping surface is 0.8 mm, i.e. two-thirds of the belt thickness. The points are preferably rounded off with a radius of 0.1 mm. The tooth point spacing in the tensional direction of the belt depends on the spacing of the weft threads of the belt while the warp threads run in the longitudinal direction of the belt and the weft threads run normal thereto. As is well known, the warp threads are the force-absorbing threads of the belt.

FIG. 18 shows another modified embodiment of the tooth arrangement having a high load capability, depending on the above mentioned differentiated force engagement, according to which the teeth decrease in height as the force share increases. For example it can be seen from FIG. 18 that the teeth downstream in the tensional direction and against the tensional direction of the belt have an increasing height which is from 0.5 via 0.6 mm, 0.7 mm for the first three rows and 0.8 mm remaining constant for the residual rows of teeth. These values correspond in the sequence named to about 40%, 50%, 60% and two-thirds of the belt thickness.

Lastly FIGS. 19a and 19b show two possible ways of securing the end of the belt in the core 124 of reel 45 of the winder. According to FIG. 19a along an eccentric chord a passage slit 128 is shown which is provided on the securing end with an expansion 130 and at the opposite end on the first deflection point of the belt 20 with a fillet 132. Corresponding to FIG. 11a the end of belt 20 is threaded through said slit 128. The end is placed in a fold 20' and is fixed there by means of a stitching hook 21. Then the end of the belt 20 is drawn in to the expansion 130 in the direction of arrow 134. The rotational direction of the coil on belt intake is shown by arrow 126. Such an arrangement is possible because the load is always absorbed by the clamping parts.

Another variant emerges from 19b, having two eccentric slits 128' and 129, slit 128' being 2 mm wide and slit 129 being 1.5 mm wide. The entry slit 128 corresponds substantially to entry slit 128 in FIG. 19a and is equally provided at the corresponding point with a fillet 132. At the opposite end between the slits, an indentation 136 is provided which is set back by the thickness of the belt. Here too the belt is introduced on the side into the entry slit 128', where the fillet 132 is provided. Accordingly the end of the belt 20 is inserted corresponding to arrow 140 in the other slit 129. In order that the end stops there, above one portion of the slit 129 there is a recess 142, which forms between itself and slit 129 a flexible wall 144, on which a tooth 146 projecting into slit 129 is provided, which tooth engages in the inserted end 20 of the belt.

This belt fastening in the core of the reel or in the shaft is possible when a belt clamping is initiated by the thrust of the shaft when the belt is fully extracted and the force is absorbed there.

We claim:

1. Safety-belt system comprising a belt and a winding and locking mechanism having a sensor and control mechanism and a clamping device having a controlled clamping portion for preventing belt withdrawal from the winding and locking mechanism, said clamping portion being operatively coupled to respond to movement of at least a part of the winding and locking mechanism relative to the winding housing, so that responsive to this relative movement the clamping portion is movable into clamping engagement with the belt, wherein, when in operation, blocking of the belt is initiated only by the clamping portion and only via blocking action of the sensor and control mechanism when the acceleration exceeds car-sensitively a low limit value of e.g. about 0.45 g (CS) and web-sensitively a low limit value of e.g. about 1.5 g (WS).

2. Safety-belt system according to claim 1, wherein a return spring of the clamping portion is adjusted in its resilient force with only such strength that the said clamp blocking can be directly initiated at the said low acceleration values.

3. Safety-belt system according to claim 1, wherein said clamping portion is rotatably mounted on a pressure loaded rocking lever arranged opposite said belt.

4. Safety-belt system according to claim 3, wherein said clamping portion is rotatably mounted with a frictional resistance in the rocking lever such that said clamping portion adopts, after its first engagement of its clamping surface on the belt, an angular position relative to said rocking lever, which it maintains for further operation, such that said clamping portion always only comes into contact with the belt over its entire clamping surface.

5. Safety-belt system according to claim 3 wherein the transmission of movement between said rocking lever and the winding and locking mechanism which initiates said movement is such that the clamping surface of said clamping portion when approaching the belt moves in the same directional component as the direction of movement of the belt at the same speed as the belt.

6. Safety-belt system according to claim 1, wherein a plurality of gripper teeth are provided on the clamping surface of said clamping portion, the points of said gripper teeth aligned contrary to the withdrawal direction of the safety-belt and towards the belt surface, and the back taper surface of said gripper teeth form an angle α of from 3° to 10° with a normal to the belt surface.

7. Safety-belt system according to claim 6, wherein the tooth height (h) is two-thirds of the belt thickness.

8. Safety-belt system according to claim 6, wherein the gripper teeth have an asymmetrical pyramidal form and the points of said gripper teeth are arranged in rows offset one behind another, the angle δ defined in FIG. 15 being about 20°.

9. Safety-belt system according to claim 6, wherein the gripper teeth are formed in adaptation to the structure of the safety-belt so that the spacing of the rows of teeth corresponds to the spacing in the webbing of the belt of the weft threads.

10. Safety-belt system according to claim 6, wherein the gripper teeth are aligned in a plane parallel to the belt surface at an acute angle to the direction of movement of the belt, preferably at an angle of 20°.

11. Safety-belt system according to claim 10, wherein a space (x) is provided between the feet of the gripper teeth respectively perpendicular to the direction of movement of the belt in the plane of the clamping surface.

12. Safety-belt system according to claim 6, wherein the tooth height (h) of the gripper teeth increases in the direction opposite to the withdrawal direction of the belt.

13. Safety-belt system according to claim 12, wherein in the named direction the gripper teeth of the first row have a height of 40%, those of the second row have a height of 50%, those of the third row a height of 60% and those of the residual rows have a constant height of two-thirds of the thickness of the belt.

14. Safety-belt system according to claim 6, wherein the width of the clamping surface occupied by the gripper teeth normal to the direction of movement of the belt decreases in the direction of movement of the belt.

15. Safety-belt system according to claim 1, wherein in the clamping surface which is provided with gripper teeth of the clamping portion a projecting strip of rubber or similar material is inserted which extends in the direction of movement of the belt along the entire clamping surface and which projects beyond the gripping teeth by the measurement (a).

16. Safety-belt system according to claim 1 provided with a rocking lever in cooperation with said clamping portion, wherein a rotational axle is formed as a projection from said clamping portion or said rocking lever and a corresponding recess is formed for reception of the rotational axle from the corresponding other part.

17. Safety-belt system according to claim 16, wherein the rotational axle of said clamping portion is a part circular-cylindrical rod facing away from the clamping surface of said clamping portion and the recess is a correspondingly adapted longitudinally hollow cylinder which is open at at least one end.

18. Safety-belt system according to claim 17, wherein the pivotal bearing surface of said rotational axle has a peripheral extension equal to or less than 180° and is engaged with a correspondingly designed concave part circular-cylindrical pivotal bearing surface, whereby a clamping portion spring fixed on the rocking lever engages on the clamping portion and connects the two parts.

19. Safety-belt system according to claim 18, wherein the clamping portion spring is guided around an engagement point on the clamping portion and is supported on a fixed housing point.

20. Safety-belt system according to claim 19, wherein the clamping portion spring engages on a point on the clamping portion which is on the rotational axle of the clamping portion.

21. Safety-belt system according to claim 1 provided with a rocking lever in cooperation with said clamping portion, wherein said rocking lever is supported by means of an axle in parallel housing walls without contact with the latter and wherein a center-fixing projection is provided in a housing cover which engages in a corresponding recess of the rocking lever, and the axle is secured against axial displacement by the housing cover.

22. Safety-belt system according to claim 1 provided with a rocking lever in cooperation with said clamping portion, wherein said rocking lever has on both sides integrated therewith bearing pins which are provided with bevels and can be latched into corresponding apertures of the parallel housing walls by spreading said walls apart and wherein said walls are connected after insertion of the rocking lever by a spacing holder.

23. Safety-belt system according to claim 22, wherein between the bearing pins and the bore located in the housing wall a bearing bushing is disposed.

24. Safety-belt system according to claim 1 provided with a housing and further provided with a rocking lever in cooperation with said clamping portion, wherein between said winding and locking mechanism, which initiates the movement of said rocking lever, and said rocking lever itself, an actuating lever is rotatably mounted on the housing side, which in its idle position, permits free rotation of the winding and locking mechanism.

25. Safety-belt system according to claim 1 provided with a housing, wherein on the housing side opposite said clamping portion and opposite the clamping engagement side of said clamping portion with said belt, a counter-pressure surface is applied which is comprised of a material having a low frictional coefficient.

26. Safety-belt system according to claim 25, wherein said counter-pressure surface is provided by a low frictional coefficient portion applied on the housing, wherein said portion applied on the housing simultaneously forms a belt guide on the entry side and/or on the exit side.

27. Safety-belt system according to claim 25, wherein the counter-pressure surface is spherical.

28. Safety-belt system according to claim 26 wherein the housing-applied portion consists of a plastic portion in which from the rear a plurality of metal bars can be inserted for increasing the resistance to the bending of the rear wall of the housing.

29. Safety-belt system according to claim 1, wherein said winding and locking mechanism is comprised of a winding reel core wherein the end portion of the belt is secured in an eccentric slit provided in said winding reel core by disposing a thickened portion of said end portion of said belt in an expanded portion of said slit.

30. Safety-belt system according to claim 29 wherein said end portion of said belt is secured in said winding reel core by guiding said end portion of said belt through a slit provided on one side of the rotational axle through said winding reel core and further guiding said end portion of said belt via a retainer indentation through a retaining slit provided on the other side of said rotational axle of said winding reel core.

31. Safety-belt system according to claim 30, wherein at least one retainer projection projects into at least one of said retainer slits.

* * * * *